(12) United States Patent
Lefevre et al.

(10) Patent No.: US 7,490,329 B2
(45) Date of Patent: Feb. 10, 2009

(54) REMOTE KEY MANAGER

(75) Inventors: Chad Andrew Lefevre, Indianapolis, IN (US); Steven Lee Cooper, Jr., Whitestown, IN (US); James Duane Tenbarge, Fishers, IN (US); David Johnston Lynch, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 466 days.

(21) Appl. No.: 10/512,313

(22) PCT Filed: Apr. 17, 2003

(86) PCT No.: PCT/US03/11770
§ 371 (c)(1),
(2), (4) Date: Oct. 22, 2004

(87) PCT Pub. No.: WO03/090068
PCT Pub. Date: Oct. 30, 2003

(65) Prior Publication Data
US 2006/0041874 A1    Feb. 23, 2006

Related U.S. Application Data

(60) Provisional application No. 60/374,400, filed on Apr. 22, 2002.

(51) Int. Cl.
*G06F 13/00*    (2006.01)
(52) U.S. Cl. .................. 719/311; 718/100; 718/107
(58) Field of Classification Search ................ 719/311; 718/100, 107
See application file for complete search history.

(56) References Cited

U.S. PATENT DOCUMENTS

| 5,566,337 A | * | 10/1996 | Szymanski et al. .......... 710/260 |
| 5,961,651 A | * | 10/1999 | Gittins et al. .................. 714/5 |
| 6,400,996 B1 | * | 6/2002 | Hoffberg et al. .............. 700/83 |

(Continued)

FOREIGN PATENT DOCUMENTS

EP    0394614    10/1990

(Continued)

OTHER PUBLICATIONS

M. Russinovich et al. "Examining VXD Service Hooking", Dr. Dobb's Journal, M&T Publ., vol. 21, No. 5, May 1, 1996, pp. 32, 34, 36-37.

(Continued)

*Primary Examiner*—Andy Ho
(74) *Attorney, Agent, or Firm*—Joseph J. Laks; Robert D. Shedd; Reitseng Lin

(57) ABSTRACT

An apparatus having a memory and an operating system running a plurality of applications that are controlled by user signals, means to register the user signals required by each application, means to receive user signals, and means to send each received user signal to the application registered to require that signal. A method of passing user signals to a plurality of applications running with an operating system comprising receiving from each application information on user signals required by that application; saving in a memory the required user signals associated with each application; receiving a user signal from a user interface device; retrieving from the memory applications that require the received user signal; and sending the received user signal to each of the retrieved applications.

12 Claims, 1 Drawing Sheet

U.S. PATENT DOCUMENTS

| | | | |
|---|---|---|---|
| 6,711,620 B1* | 3/2004 | Yoshii et al. | 709/229 |
| 7,058,485 B2* | 6/2006 | Thomas et al. | 701/1 |
| 2002/0026421 A1* | 2/2002 | Drummond et al. | 705/43 |
| 2002/0165983 A1* | 11/2002 | Gastaldi | 709/245 |
| 2003/0106064 A1* | 6/2003 | Plourde, Jr. | 725/91 |
| 2006/0156342 A1* | 7/2006 | Xiao | 725/50 |

FOREIGN PATENT DOCUMENTS

EP    1045305    10/2000

OTHER PUBLICATIONS

Search Report dated Sep. 20, 2004.

* cited by examiner

REMOTE KEY MANAGER

CROSS-REFERENCE TO RELATED APPLICATIONS

This application claims the benefit, under 35 U.S.C. § 365 of International Application PCT/US03/11770, filed Apr. 17, 2003, which was published in accordance with PCT Article 21(2) on Oct. 30, 2003 in English and which claims the benefit of U.S. Provisional Patent Application No. 60/374,400, filed Apr. 22, 2002.

TECHNICAL FIELD OF INVENTION

This invention relates to the field computer operating systems, and particularly to managing user commands in devices running a plurality of applications.

BACKGROUND ART

Devices have become available which run a plurality of applications and receive a plurality of user control signals. For example, devices that include television, Internet, satellite television, personal video recorder (PVR), and digital versatile disk (DVD) applications, among others, controlled by a single operating system such as Windows CE, are known.

The operating systems in such devices receive user signals from a plurality of sources, for example infrared (IR) signals from a remote control device, electronic signals from a front panel assembly (FPA), and other parts of the system. Data is received and processed from the respective IR drivers, FPA drivers, and other parts of the system. Presently available systems assume the keys are intended for the foreground window. However, sometimes the user intends to control a background application, which is not possible with present systems.

DISCLOSURE OF INVENTION

An object of the present invention is to organize the receipt of various user keys and direction thereof to various applications. This object, and others which will become apparent from the following disclosure and drawings, is addressed by the present invention which comprises in one aspect an apparatus having a memory and an operating system running a plurality of applications which are controlled by user signals, means to register the user signals required by each application, means to receive user signals, and means to send each received user signal to the application registered to require that signal.

Another aspect of the invention is a method of passing user signals to a plurality of applications running with an operating system, the method comprising receiving from each application information on user signals required by that application; saving in a memory the required user signals associated with each application; receiving a user signal from a user interface device; retrieving from the memory applications that require the received user signal; and sending the received user signal to each of the retrieved applications.

The received user signal can be sent directly to the application or it can be translated to a second signal recognizable by the operating system, which is in turn sent to the operating system.

An example of an operating system, which is currently typical, is Windows CE, but other operating systems can, of course, be used in the invention. Typically, the applications comprise a user interface and a browser.

The user signals may be received, for example, by IR from a remote control device, from front panel buttons, and/or from the system. Certain applications can "fake" a key press, for example.

Error checking and conversion of user signals can be conducted by known methods and software.

A key manager can be provided, and the key manager can be registered with an infrared driver and a front panel assembly driver.

Active application programs can be registered with the key manager and be unregistered when they become inactive. When the application becomes registered, a set of keys corresponding to each active program can be registered so that when keys are received, the key manager passes the received keys to an active application program for which the keys are registered.

A message queue corresponding to each application program can be registered, including the name and size of the queue, upon which the key manager can create one end of the message queue for passing keys to the application program. In some embodiments, all the keys are translated to match an operating system equivalent, sent to the operating system upon receipt, and thereafter passed to the top level application, and if the top level application does not want the key, the key is then passed sequentially to the next application which wants the key. In some embodiments, the system provides an option to block applications below an assigned priority level to receive keys. In some embodiments, the keys are translated to match an operating system equivalent, sent to the operating system upon receipt, and thereafter passed to each application that responds to the key. Upon registration of the application, the type of keys required by the application can be registered by the key manager.

The apparatus to which this invention is applicable comprise a memory and an operating system adapted to run a plurality of applications which are controlled by user signals, means to register the user signals required by each application, means to receive user signals, and means to send each received user signal to the application registered to require that signal. Examples of such apparatus are televisions with Internet browser capability. The apparatus will usually have a means to display a user interface, means to receive remote control signals, means to receive front panel assembly signals, and means to receive keyboard signals.

MODES FOR CARRYING OUT THE INVENTION

Figure 1:
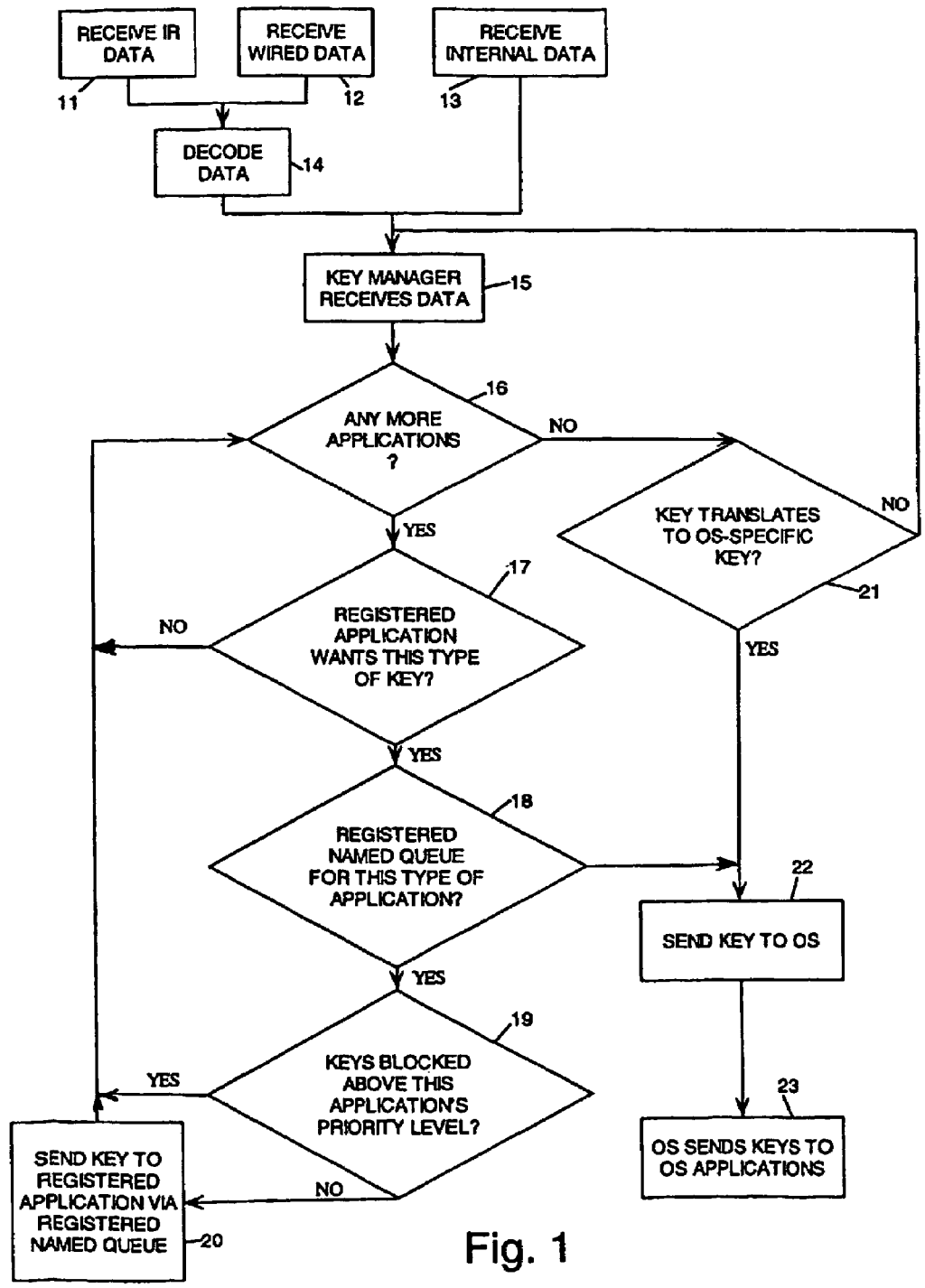
FIG. 1 is a high level flow chart of a method according to the invention.

Referring first to FIG. 1, a process is illustrated wherein raw keys from an IR driver, keyboard, and FPA are passed to different applications and systems.

The process and apparatus of the invention will be referred to herein as the Key Manager. In the illustrated embodiment, the Key Manager takes the raw keys from the IR driver in the form of IR data 11 and Front Panel Assembly (FPA) keys in the form of wired data 12 and decodes 14 the raw key data. The Key Manager 15 also receives internal data 13 from other parts of the system, for example other applications that may "fake" keys. The Key Manager 15 manages passing the decoded key data to different applications and systems, so that each part receives what it expects, as illustrated in this example.

After receiving a key press from, for example the remote control via IR 11, the Key Manager 15 determines 16 if there is a registered application and if so, then whether 17 the registered application wants the type of key received by the Key Manager. If the first registered application does not 17 want the type of key sent by the Key Manager, the Key Manager checks 16 whether there are any more registered applications until it finds one which wants the type of key being sent 17, and then checks 18 whether there is a registered queue for that application.

If there are no more registered applications, the Key Manager checks 21 whether the key translates to an operating system specific key and if so, sends 22 the key to the operating system, otherwise the Key Manager waits for another key. The Key Manager then determines 18 if there is a registered named queue for the application which wants the type of key being sent and if so, the Key Manager checks 19 whether keys are blocked for that application. Each application is assigned a priority level. If the keys are not blocked 19 above that application's priority level, the Key Manager sends 20 the key to the registered application via the registered named queue, otherwise, if the keys are blocked above that application's priority level, the Key Manager checks 16 for the next registered application. If the Key Manager checks 18 for whether there is a registered named queue for the first registered application that wants the type of key which was received by the Key Manager and if there is no registered named queue for the first registered application which wants that type of key, the key is sent 22 to the operating system which then sends 23 the key to operating system applications.

As an example of how the Key Manager solves a problem, the user interface (UI) and the browser both need to be aware of a "Channel Up" key when the browser is showing, i.e., the browser is in the foreground. Both applications would ask for the Channel Up key in this instance. Since the key manager sends keys to any known application that asks for them, and also to any known or unknown application that is using the default method to receive keys, both the UI and the browser would receive the Channel Up key press signal.

This invention takes key data from the low-level system and manages its passing to higher parts of the system. Some of the data is based upon infrared (IR) protocols, some of it is retrieved from buttons of the FPA, and some of it is sent back through the system. After basic error checking and conversion on the data is done, the data is passed to the Key Manager to be handled.

The Key Manager registers itself with the IR\FPA drivers in order to receive keys from them. Applications running at higher levels are registering and unregistering with the Key Manager. The Key Manager uses the registration data to govern which applications should get which keys. When the Key Manager receives data from the IR driver, the FPA driver, and other parts of the system, it preprocesses it and then passes the data to other parts of the system based on how they registered with the Key Manager.

There are two ways that the Key Manager passes keys. The first method is via message queues. When an application registers with the Key Manager, it supplies the name and size for its message queue. The Key Manager then creates one end of that queue, which it will use to pass keys to that application. The second method is via Microsoft Windows key-passing mechanism. All keys are translated to match the Windows Virtual Key equivalent, and then doled out to the Operating System, which then passes the keys to the top-level application (if that application does not want the key, then Windows passes it down to the next application, and so on).

The Key Manager has the ability to pass keys to both "known" applications (that may or may not use the Microsoft Windows CE method of passing keys) and "unknown" applications (which use the Microsoft Windows CE method of passing keys). Since Microsoft Windows CE will only pass keys to the foreground application, the present improved system allows multiple applications to see what key had been pressed. In certain circumstances, more than one application may need to respond to a key, i.e., the browser and the UI. With the conventional Microsoft Windows CE method of passing keys, that ability is not present. The Key Manager has ability to register and unregister known applications, which is an improvement.

When an application registers with the Key Manager, it also tells the Key Manager what type of keys it wants. Its choices are remote control keys, keyboard keys, and FPA keys. The Key Manager uses this information to decide whether the application wants to receive keys from certain devices.

While the invention and the best mode known to the inventors for carrying it out has been described herein in sufficient detail for others skilled in this art to understand it and to make and use it, various alternatives, modifications, and improvements should become readily apparent without departing from the spirit and scope thereof.

The invention claimed is:

1. A method for passing user signals in an apparatus having a multi-tasking operating system, the method comprising the steps of:

receiving, via a key manager, a user signal from a user interface device; identifying, via the key manager, a first application that requires the received user signal;

sending the received user signal from the key manager to the first application bypassing the operating system and thereby enabling the first application to perform a first user function;

after sending the received user signal from the key manager to the first application, translating, via the key manager, the received user signal to a second signal recognizable by the operating system; and sending the second signal from the key manager to the operating system for sending to a second application running under the operating system and thereby enabling the second application to perform a second user function.

2. The method of claim 1 wherein the first and second applications comprise a user interface and a browser.

3. The method of claim 1 wherein the user signals are received by IR from a remote control device, from front panel buttons, and/or from the system.

4. The method of claim 1, further including error checking and conversion of user signals.

5. The method of claim 1 comprising registering the key manager with an infrared driver and a front panel assembly driver, registering applications that are active and unregistering applications that are inactive with the key manager, registering a set of user signals corresponding to each active application and unregistering the set of user signals upon an active application becoming inactive, and sending received user signals to an active application for which the received user signals are registered.

6. The method of claim 5 wherein upon registration of an application, a name and size for a message queue corresponding to the application is stored by the key manager, upon which the key manager creates one end of the message queue for passing user signals to the application.

7. The method of claim 5 wherein the second application running under the operating system is a top level application, and if the top level application does not want the second signal, the operating system sends the second signal sequentially to a next highest level of application running under the operating system, which accepts the second signal.

8. The method of claim 5 wherein upon registration of an application with the key manager, the type of user signals required by the application is registered.

9. The method of claim 8 wherein the type of user signals is selected from the group consisting of remote control keys, keyboard keys, and front panel assembly keys.

10. An apparatus, comprising:
an operating system;
a key manager operative to receive a user signal and send said received user signal to a first application that requires said received user signal bypassing the operating system and thereby enabling said first application to perform a first user function; and
wherein after sending said received user signal to said first application, said key manager translates said received user signal to a second signal recognizable by the operating system and sends said second signal to said operating system for sending to a second application running under said operating system and thereby enables said second application to perform a second user function.

11. The apparatus of claim 10 comprising a television, a browser, a display, and a keyboard.

12. The apparatus of claim 10 comprising means for displaying a user interface, means for receiving infrared remote control signals, means for receiving front panel assembly signals, and means for receiving keyboard signals.

* * * * *